(12) United States Patent
Moehrle et al.

(10) Patent No.: US 11,785,317 B2
(45) Date of Patent: Oct. 10, 2023

(54) CAMERA MODULE AND METHOD FOR MANUFACTURING A CAMERA MODULE

(71) Applicant: Robert Bosch GmbH, Stuttgart (DE)

(72) Inventors: Andreas Moehrle, Stuttgart (DE); Guido Bernd Finnah, Weissach (DE); Joerg Engelhardt, Ditzingen (DE); Peter Diesel, Bad Hindelang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/643,139

(22) Filed: Dec. 7, 2021

(65) Prior Publication Data
US 2022/0191354 A1 Jun. 16, 2022

(30) Foreign Application Priority Data

Dec. 11, 2020 (DE) ...................... 10 2020 215 734.0

(51) Int. Cl.
*H04N 23/51* (2023.01)
*G03B 17/12* (2021.01)
*H04N 23/57* (2023.01)
(52) U.S. Cl.
CPC ............. *H04N 23/51* (2023.01); *G03B 17/12* (2013.01); *H04N 23/57* (2023.01)

(58) Field of Classification Search
CPC .. G03B 17/12; H04N 5/2252; H04N 5/22521; H04N 5/2254; H04N 5/2257
See application file for complete search history.

(56) References Cited

U.S. PATENT DOCUMENTS

| 2019/0137723 A1* | 5/2019 | Bernal | H04N 23/55 |
| 2020/0201146 A1* | 6/2020 | Freeman | G03B 31/00 |
| 2022/0057694 A1* | 2/2022 | Park | G05D 23/1931 |
| 2022/0196964 A1* | 6/2022 | Seo | H04N 23/00 |

FOREIGN PATENT DOCUMENTS

DE 102019203378 A1 9/2020

* cited by examiner

*Primary Examiner* — Amy R Hsu
(74) *Attorney, Agent, or Firm* — NORTON ROSE FULBRIGHT US LLP; Gerard Messina

(57) ABSTRACT

A camera module. The camera module includes a circuit board on which at least one image sensor is situated; an objective including a lens housing and multiple optical lenses situated inside the lens housing; an objective holder, which is connected to the circuit board and is designed to hold the objective; and at least one temperature control element, which is designed to influence the temperature of at least one front lens of the objective; a second optical lens being situated at the front lens. The front lens and/or the second optical lens includes/include at least one recess, the at least one temperature control element being situated in the at least one recess.

7 Claims, 2 Drawing Sheets

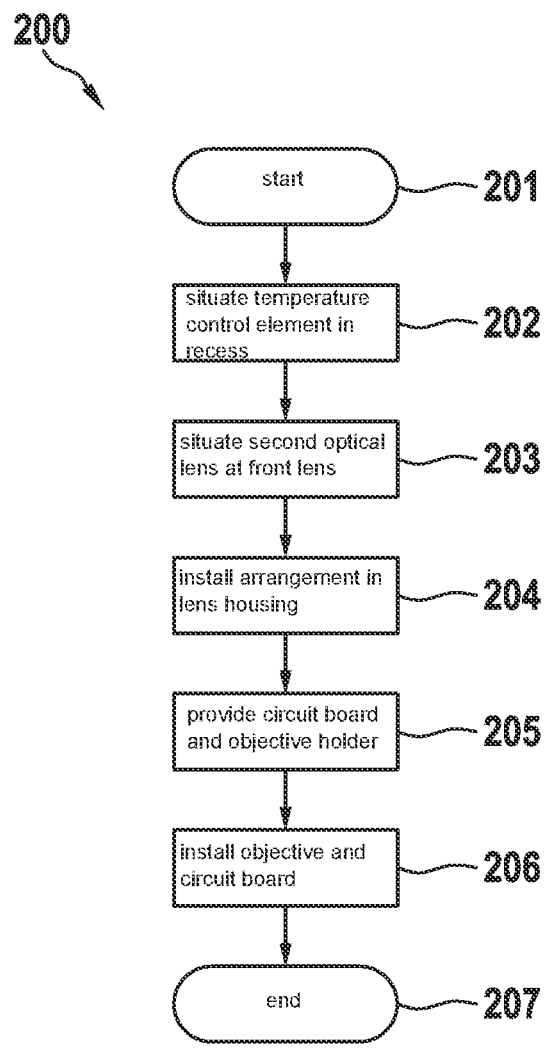

CAMERA MODULE AND METHOD FOR MANUFACTURING A CAMERA MODULE

CROSS REFERENCE

The present application claims the benefit under 35 U.S.C. § 119 of German Patent Application No. DE 102020215734.0 filed on Dec. 11, 2020, which is expressly incorporated herein by reference in its entirety.

FIELD

The present invention relates to a camera module for a motor vehicle and a method for manufacturing a camera module.

BACKGROUND INFORMATION

Camera modules are usable in industrial, safety-relevant applications and in consumer products. In the automotive field, for example, a camera module has to be designed in such a way that it functions both in very cold (approximately −40° C.) and very hot (approximately +105° C.) surroundings. Electronic components of camera modules usually include a power loss during operation, due to which self-heating occurs. For this reason, the camera modules are usually designed in such a way that good heat dissipation to the surroundings may take place. Nonetheless, it may be necessary, regardless of the temperature of the electronic components, to heat an optical unit of a camera module, in particular in cold areas, or to cool it even more strongly in very hot areas.

German Patent Application No. DE 10 2019 203 378 A1 describes an optical unit for an image detection device for a vehicle, which includes a lens housing that is formed to accommodate at least one lens. Furthermore, the optical unit includes a holding element that is formed to hold the lens at the lens housing, and a heating element that is situated or may be situated at the holding element and is designed to heat the lens.

SUMMARY

The present invention is directed to a camera module, in particular for a motor vehicle. In accordance with an example embodiment of the present invention, the camera module includes a circuit board, on which at least one image sensor is situated; an objective including a lens housing and multiple optical lenses situated inside the lens housing; an objective holder, which is connected to the circuit board and is designed to hold the objective; and at least one temperature control element, which is designed to influence the temperature of at least one front lens of the objective; a second optical lens being situated at the front lens.

According to an example embodiment of the present invention, the front lens and/or the second optical lens includes/includes at least one recess, the at least one temperature control element being situated in the at least one recess.

Multiple optical lenses mean that at least the front lens and the second optical lens are situated inside the lens housing. In addition, at least one further optical lens may be situated in the lens housing. The optical lens which faces toward a detection area of the camera module may be understood as the front lens. The front lens is situated in this case at the side facing away from the circuit board inside the lens housing. The front lens is the optical lens of the objective which has the greatest distance to the circuit board. The second optical lens is also situated inside the lens housing. The second optical lens is situated at the front lens in such a way that it is positioned closer to the circuit board. The second optical lens is the optical lens of the objective which has the second greatest distance to the circuit board. The at least one further optical lens situated inside the lens housing has a smaller distance to the circuit board than the second optical lens. The at least one further optical lens has an even smaller distance to the circuit board than the front lens. The lenses situated in the lens housing may be formed from glass or plastic. Plastic offers the advantage here of being a lighter material than glass. The front lens is preferably formed from glass. This is advantageous because glass is more resistant than plastic to aging effects, as may be caused by environmental influences such as moisture or direct UV radiation.

In accordance with an example embodiment of the present invention, the objective holder may be connected to the circuit board in a materially-bonded, formfitting, or force-fitting manner. The objective holder may be connected to the circuit board with the aid of at least one connecting element. The objective may be situated at at least one point of the objective holder. The lens housing may be situated at at least one point of the objective holder. In this way, the objective holder may hold the objective. The camera module may furthermore include at least one alignment element, which is situated between the objective holder and the lens housing in such a way that the lens housing is fastenable at the objective holder in a position optically aligned in relation to the image sensor.

The at least one recess is situated in particular outside an optical path of the objective. The recess and the temperature control element situated therein thus has no effects on the optical properties of the objective. The recess is in particular geometrically formed to partially or completely accommodate the temperature control element. If only the second optical lens includes at least one recess, a temperature control element may thus be accommodated completely in a recess of the second optical lens. If only the front lens includes at least one recess, a temperature control element may thus be accommodated completely in a recess of the front lens. The front lens and the second optical lens may each include at least one recess. In this embodiment variant, a recess of the front lens and a recess of the second optical lens are preferably situated opposite to one another. The at least one temperature control element may in this case be situated partially in the recess of the front lens and partially in the recess of the second optical lens.

The temperature control element may be contacted with a voltage source. The voltage source may be situated inside the camera module. For example, the circuit board may be designed as the voltage source of the temperature control element.

An advantage of the present invention is that a camera module is provided in which the temperature control element is situated better protected from external influences. Moreover, stable positioning of the temperature control element in the objective may be ensured with the aid of the recess. Robust, stable, and secure temperature control of an optical unit of the camera module may be ensured in this way.

The recess is in particular formed in the form of a circular ring, as a polygon, as a torus, or as a hollow cylinder, the recess being situated in such a way that its center point is situated on the optical path of the objective. In this variant, the temperature control element is also in particular formed in the form of a circular ring, as a polygon, as a torus, or as a hollow cylinder. The temperature control element may be circumferentially closed. A homogeneous temperature distribution may be ensured in this way.

Alternatively, the recess may be formed in the form of a circular ring, as a polygon, as a torus, or as a hollow cylinder including an opening. The recess is not circumferentially closed in this case. The temperature control element may also be formed in this variant in particular in the form of a circular ring, as a polygon, as a torus, or as a hollow cylinder including an opening. The recess and/or the temperature control element may have a semi-open geometry, for example, a 340° geometry. The advantage of this variant is that at least one contacting element may be situated in the opening of the temperature control element. In particular, two contacting elements may be situated in the opening of the temperature control element. The two contacting elements may advantageously be positioned directly adjacent to one another. This has advantages above all with respect to electrical contacting with a voltage source. Only one electrical interface is required at only one position.

Alternatively, the camera module may also include multiple recesses and multiple temperature control elements situated therein. The recesses may be situated uniformly at a circumference of the front lens and/or the second optical lens for this purpose. A homogeneous temperature distribution may be implemented in this way.

In one advantageous embodiment of the present invention, it is provided that the at least one recess is situated in the front lens and/or in the second optical lens in such a way that a temperature control element situated therein is enclosed by the front lens and the second optical lens. In one particularly advantageous specific embodiment, the temperature control element is completely enclosed by the front lens and the second optical lens. Being completely enclosed may be understood here to mean that the temperature control element has a contact with at least one contacting element at at least one point. Except for the at least one contact with the at least one contacting element, the temperature control element may be completely enclosed by the front lens and the second optical lens in this particularly advantageous specific embodiment.

An advantage of this embodiment of the present invention is that the temperature control element is insulated by such an arrangement from metal surfaces which are located in the camera module. The temperature control element is protected from direct electrical contact with metallic components of the camera module which could interfere with or prevent the temperature control effect due to a voltage drop in the temperature control element. In this way, the described camera module has in particular advantages over camera modules in which corresponding temperature control elements are situated, for example, unprotected outside a lens arrangement. It also has advantages over camera modules in which a corresponding temperature control element is situated, for example, between two optical lenses of a lens arrangement, but there is the possibility that this temperature control element could have electrical contact with a metallic component of such a camera module. A metallic component in which such problems could occur would be, for example, the lens housing. In the camera module provided here, electrical short circuits may be avoided, even when the lens housing is formed from metal. The temperature control element is enclosed, protected by the front lens and the second optical lens in such a way that electrical short circuits, for example, with the lens housing, may be avoided. Moreover, the temperature control element may be protected from corrosive media. In this way, a temperature control element may be prevented from being damaged or destroyed by corrosive attack under corrosive ambient conditions, for example, as may occur for vehicle surroundings.

In one advantageous embodiment of the present invention, it is provided that the at least one recess is situated in the front lens and/or the second optical lens in such a way that a temperature control element situated therein is situated at a boundary surface between the front lens and the second optical lens.

If only the second optical lens includes at least one recess in which a temperature control element is situated, such a recess may be geometrically formed to completely accommodate the temperature control element. The temperature control element is nearly completely enclosed by the second optical lens in this case, a lateral surface of the temperature control element facing toward the front lens being enclosed by the front lens. The lateral surface of the temperature control element facing toward the front lens is situated on the boundary surface between the front lens and the second optical lens. If only the front lens includes at least one recess in which a temperature control element is situated, such a recess may be geometrically formed to completely accommodate the temperature control element. In this case, the temperature control element is nearly completely enclosed by the front lens, a lateral surface of the temperature control element facing toward the second optical lens being enclosed by the second optical lens. The lateral surface of the temperature control element facing toward the second optical lens is situated on the boundary surface between the front lens and the second optical lens. If both the front lens and the second optical lens each include at least one recess, these recesses may be geometrically formed to each partially accommodate the temperature control element. If a recess of the front lens and a recess of the second optical lens are situated opposite to one another, the temperature control element may be enclosed partially by the second optical lens and partially by the front lens. The temperature control element is situated in this case centrally at the boundary surface between the front lens and the second optical lens.

An advantage of this embodiment of the present invention is that it may be ensured in an improved manner that the temperature control element is enclosed by the front lens and the second optical lens and is situated very well protected in this way. For example, the temperature control element may be situated in a recess of the second optical lens. Subsequently, the front lens may be situated at the second optical lens in such a way that air gaps may be avoided between the front lens and the second optical lens. Air gaps between the front lens and the temperature control element may also be avoided. This ensures the most sealed possible surroundings for the temperature control element.

In one advantageous embodiment of the present invention, it is provided that the front lens and the second optical lens are connected to one another with the aid of an optical adhesive to form a lens doublet. The lens doublet may be understood as a lens group of the objective. The lens doublet may also be used as an assembly in the structure of the objective.

An advantage of this embodiment of the present invention is that the temperature control element is protected even better from voltage-induced corrosive attack. The temperature control element, which is under electrical voltage, may be prevented from displaying appearances of electrically induced corrosion. Destruction of the temperature control element or destruction of the entire camera module may be prevented in this way.

In one advantageous embodiment of the present invention, it is provided that the at least one temperature control element is hermetically sealed in the lens doublet.

An advantage of this embodiment of the present invention is that corrosive media may be prevented from being able to penetrate to the temperature control element in an improved way. A material contact of corrosive media with the temperature control element may be prevented, due to which a voltage-induced corrosion of the temperature control element is avoided. The temperature control element and also the camera module may be made longer-lived.

In one advantageous embodiment of the present invention, it is provided that the temperature control element is designed as a film heating element, as a metallic electrical heating conductor, or as a doped plastic element. The temperature control element may advantageously be accordingly made flexible. This also enables more flexibility in the selection of both the geometry and the material of the front lens and/or the second optical lens.

In one advantageous embodiment of the present invention, it is provided that at least one passage from the at least one recess to a side of the second optical lens opposite to the recess is formed in the second optical lens; and a contacting element being situated in the at least one passage, which is designed to contact the temperature control element with a voltage source.

The passage may also be referred to as a contacting via. The second optical lens is preferably made of plastic in this embodiment. A passage described here may also be formed for the embodiment in which the temperature control element is completely enclosed by the front lens and the second optical lens. A transition point from the temperature control element to the passage may be formed insulated here in particular. A transition point from the temperature control element to the contacting element may be formed insulated here in particular.

An advantage of this embodiment of the present invention is that a simple and space-saving contacting option of the temperature control element is presented, in which nonetheless the protection of the temperature control element from contact with a metallic component or from corrosive media may be ensured.

The present invention is furthermore directed to a method for manufacturing a described camera module in accordance with the present invention. In accordance with an example embodiment of the present invention, the method includes the steps of situating the at least one temperature control element in the at least one recess of the front lens and/or in the at least one recess of the second optical lens; situating the second optical lens at the front lens; installing the arrangement made of front lens and second optical lens in the lens housing to provide the objective; providing the circuit board and the objective holder; and installing the objective, the objective holder, and the circuit board to manufacture the described camera module.

In one advantageous embodiment of the present invention, it is provided that during the situating, the front lens and the second optical lens are connected to one another with the aid of an optical adhesive to form a lens doublet.

It is understood that the above-mentioned features and the features still to be explained hereinafter are usable not only in the particular indicated combination but also in other combinations or alone without departing from the scope of the present invention.

BRIEF DESCRIPTION OF THE DRAWINGS

Exemplary embodiments of the present invention are explained in greater detail hereinafter based on the figures. Identical reference numerals in the figures identify identical or identically acting elements.

FIG. 2 shows an exemplary embodiment of a method for manufacturing a camera module, in accordance with the present invention.

DETAILED DESCRIPTION OF EXAMPLE EMBODIMENTS

Figure 1:
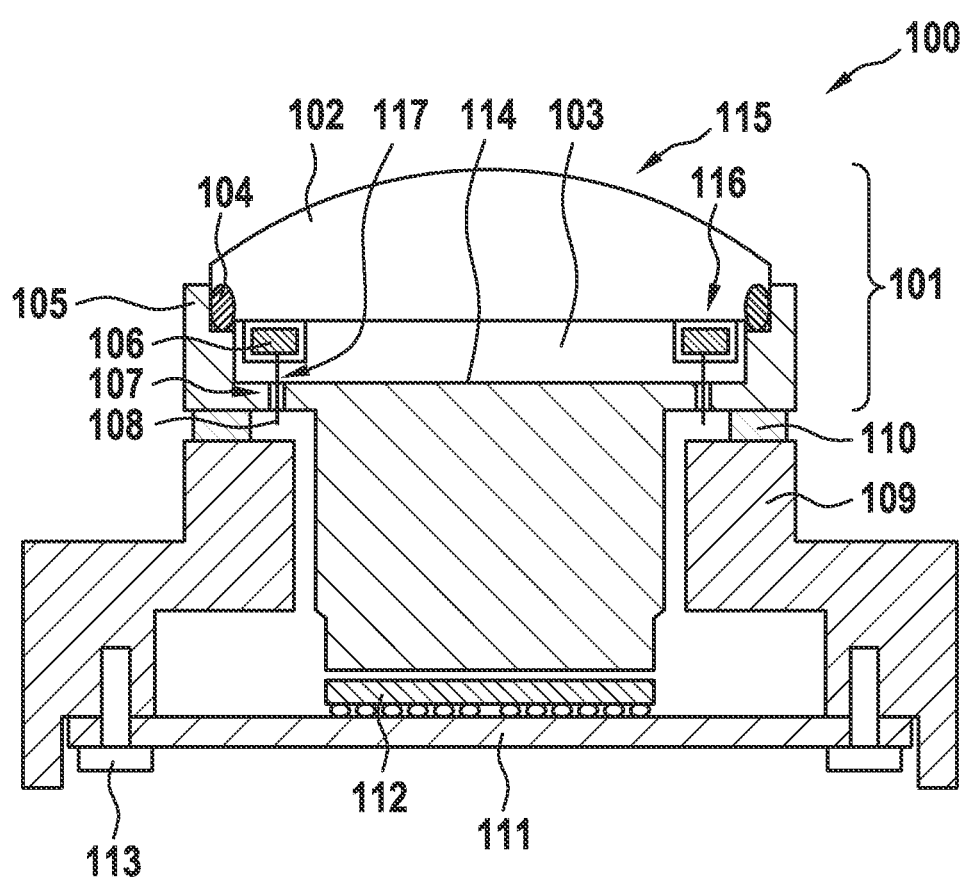
FIG. 1 shows an exemplary embodiment of a camera module, in accordance with the present invention.

FIG. 1 shows camera module 100 by way of example. This module includes a circuit board 111, on which image sensor 112 is situated. Circuit board 111 is connected here in the example with the aid of connecting elements 113 to an objective holder 109. Connecting elements 113 are designed here by way of example as screws. Objective holder 109 is designed to hold objective 115. Objective holder 109 may be made of metal or plastic. Objective 115 includes lens housing 105 and multiple optical lenses situated inside lens housing 105. Lens housing 105 may be made of metal or plastic. In the example shown here, objective 115 includes front lens 102, a second optical lens 103 situated at front lens 102, and further optical lenses 114. As shown in the example here, a seal element 104 may be situated between lens housing 105 and front lens 102. Furthermore, camera module 100 includes a temperature control element 106. Temperature control element 106 is designed to influence the temperature of at least front lens 102 of objective 115. Temperature control element 106 may influence, for example, both the temperature of front lens 102 and the temperature of second optical lens 103 in the present specific embodiment. Temperature control element 106 may be designed as a film heating element, as a metallic electrical heating conductor, or as a doped plastic element. Temperature control element 106 may thus increase in particular the temperature of front lens 102 and/or the temperature of second optical lens 103.

In the example shown, second optical lens 103 includes a recess 116. Temperature control element 106 is situated in recess 116. In another exemplary embodiment (not shown here), front lens 102 may include a recess 116, in which temperature control element 106 is situated. In another exemplary embodiment (not shown here), both front lens 102 and second optical lens 103 may each include at least one recess 116. A recess 116 of front lens 102 may be situated opposite to a recess 116 of second optical lens 103 in this case. Temperature control element 106 may then be situated both in recess 116 of front lens 102 and recess 116 of second optical lens 103.

As shown in FIG. 1, the recess may be situated in second optical lens 103 in such a way that temperature control element 106 situated therein is enclosed by the front lens and the second optical lens. This also applies to recesses in front lens 102 or to recesses in second optical lens 103 and front lens 102.

It is furthermore apparent in FIG. 1 that recess 116 may be situated as shown here in second optical lens 103 in such a way that temperature control element 106 situated therein is situated at a boundary surface 117 between front lens 102 and second optical lens 103.

Front lens 102 and second optical lens 103 may be connected to one another with the aid of an optical adhesive to form a lens doublet 101. Temperature control element 106 may be hermetically sealed in lens doublet 101.

In the exemplary embodiment shown, second optical lens 103 includes a passage 117 from recess 116 to a side of second optical lens 103 opposite to recess 116. A contacting element 108 is situated in passage 117. Contacting element 108 is designed to contact temperature control element 106 with a voltage source. The voltage source may be situated inside the camera module. In the example, lens housing 105 also includes a passage 107. Contacting element 108 is also situated in passage 107. In other words, contacting element 108 is situated in such a way that it leads through passage 117 of second optical lens 103 and through passage 107 of lens housing 105. A contacting of temperature control element 106 with a voltage source which is situated in the interior of camera module 100 may be enabled in this way.

As shown in the exemplary embodiment here, camera module 100 may furthermore include an alignment element 110. Alignment element 110 is situated here between objective holder 109 and lens housing 105 in such a way that lens housing 105 is fastenable at objective holder 109 in a position optically aligned to image sensor 112.

FIG. 2 shows as an exemplary embodiment method 200 for manufacturing a camera module as shown, for example, in FIG. 1. The method starts in step 201. In step 202, the at least one temperature control element is situated in the at least one recess of the front lens or in the at least one recess of the second optical lens. In step 203, the second optical lens is situated at the front lens. In step 204, the arrangement made up of front lens and second optical lens is installed in the lens housing. In this way, the objective is provided for the camera module. In step 205, the circuit board and the objective holder are provided. In step 206, the objective of the objective holder and the circuit board are installed to manufacture a corresponding camera module. The method ends in step 207.

In step 203, the front lens and the second optical lens are preferably connected to one another with the aid of an optical adhesive to form a lens doublet.

What is claimed is:

1. A camera module, comprising:
   a circuit board on which at least one image sensor is situated;
   an objective including a lens housing and multiple optical lenses situated inside the lens housing;
   an objective holder, which is connected to the circuit board and is configured to hold the objective;
   at least one temperature control element, which is configured to influence a temperature of at least one front lens of the objective; and
   a second optical lens situated on the front lens;
   wherein the front lens and/or the second optical lens includes at least one recess, the at least one temperature control element being situated in the at least one recess, wherein the front lens and the second optical lens are connected to one another using an optical adhesive to form a lens doublet.

2. The camera module as recited in claim 1, wherein the at least one recess is situated in the front lens and/or in the second optical lens in such a way that a temperature control element situated in the at least one recess is enclosed by the front lens and the second optical lens.

3. The camera module as recited in claim 1, wherein the at least one recess is situated in the front lens and/or the second optical lens in such a way that a temperature control element situated in the at least one recess is situated at a boundary surface between the front lens and the second optical lens.

4. The camera module as recited in claim 1, wherein the at least one temperature control element is hermetically sealed in the lens doublet.

5. The camera module as recited in claim 1, wherein the temperature control element is a film heating element, or a metallic electrical heating conductor, or a doped plastic element.

6. The camera module as recited in claim 1, wherein at least one passage from the at least one recess to a side of the second optical lens opposite to the at least one recess is in the second optical lens, and a contacting element is situated in the at least one passage, which is configured to contact the temperature control element with a voltage source.

7. A method for manufacturing a camera module, the camera module including a circuit board on which at least one image sensor is situated, an objective including a lens housing and multiple optical lenses situated inside the lens housing, an objective holder, which is connected to the circuit board and is configured to hold the objective, at least one temperature control element, which is configured to influence a temperature of at least one front lens of the objective, and a second optical lens situated on the front lens, wherein the front lens and/or the second optical lens includes at least one recess, the at least one temperature control element being situated in the at least one recess, the method comprising the following steps:
   situating the at least one temperature control element in the at least one recess of the front lens or in the at least one recess of the second optical lens;
   situating the second optical lens at the front lens;
   installing the arrangement made up of front lens and second optical lens in the lens housing to provide the objective;
   providing the circuit board and the objective holder; and
   installing the objective, the objective holder, and the circuit board to manufacture the camera module, wherein during the situating of the second optical lens at the front lens, the front lens and the second optical lens are connected to one another using an optical adhesive to form a lens doublet.

* * * * *